United States Patent [19]

Brown

[11] Patent Number: 4,746,050
[45] Date of Patent: May 24, 1988

[54] SOLDER REMOVAL DEVICES

[76] Inventor: Frank Brown, Ward Rd., Cape Porpoise, Me. 04014

[21] Appl. No.: 5,145

[22] Filed: Jan. 20, 1987

[51] Int. Cl.$^4$ .............................................. B23K 3/00
[52] U.S. Cl. ...................................................... 228/57
[58] Field of Search .............. 228/51, 52, 57; 30/188, 30/190; 83/649, 605; 226/127

[56] References Cited

U.S. PATENT DOCUMENTS

| | | | |
|---|---|---|---|
| 3,035,345 | 5/1962 | Barnard | 83/649 |
| 3,250,453 | 5/1966 | Halstead | 228/52 |
| 3,386,634 | 6/1968 | Curry | 83/649 |
| 3,715,797 | 2/1973 | Jackson et al. | 228/19 |
| 3,726,464 | 4/1973 | Howell et al. | 228/19 |
| 4,078,714 | 3/1978 | Spirig | 228/264 |
| 4,416,408 | 11/1983 | Spirig | 228/19 |
| 4,643,059 | 2/1987 | Phillips et al. | 83/649 |

*Primary Examiner*—M. Jordan
*Attorney, Agent, or Firm*—Rhines, William G.

[57] ABSTRACT

This invention relates to apparatus for use in connection with material such as fluxed, woven, copper ribbon, sometimes called "desoldering braid" to capture and removed unwanted, molten solder from electronic components. A preferred embodiment comprises a hand-held desoldering braid gun having a handle in which a supply of desoldering braid may be stored, a finger trigger actuated pincer-type cutter positioned in the mouth of the "barrel" of the gun, a guide conduit for forming a path for desoldering braid coming from the handle through the cutter, and a thumb-actuated drive mechanism for moving desoldering braid to and fro past the cutters. Another embodiment includes a handle to receive a pre-packaged cassette of desoldering braid. Using embodiments of this invention, a length of desoldering braid may be introduced to unwanted solder which has been rendered molten to a liquid state, to capture and remove it from its site, following which the cutter may be actuated to sever off the solder laden length of braid when the solder has hardened. By this means, such operations may be performed with one hand, freeing the other to do collateral operations, such as holding a solder heating source.

10 Claims, 3 Drawing Sheets

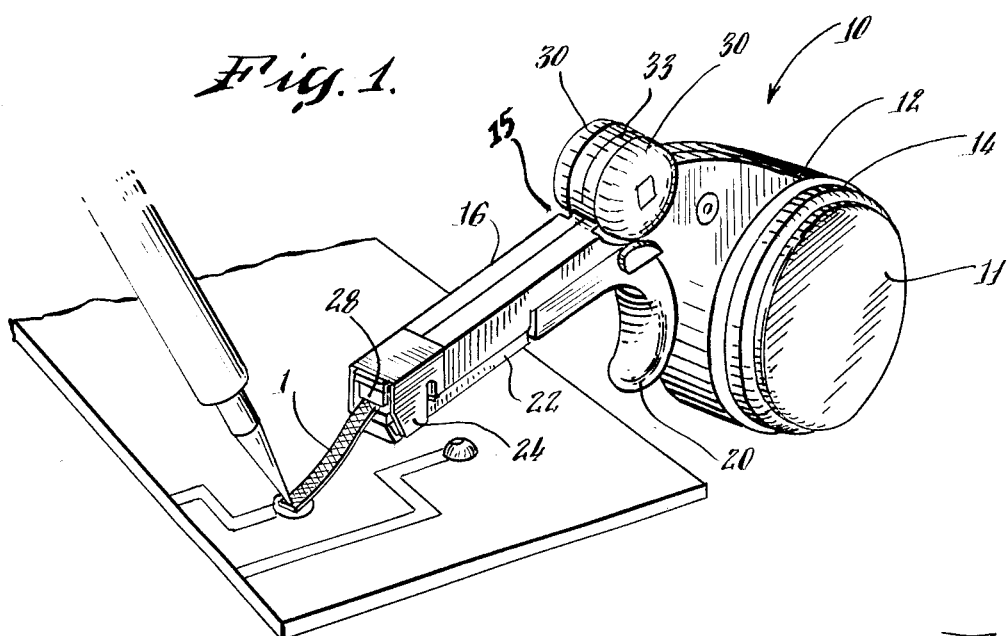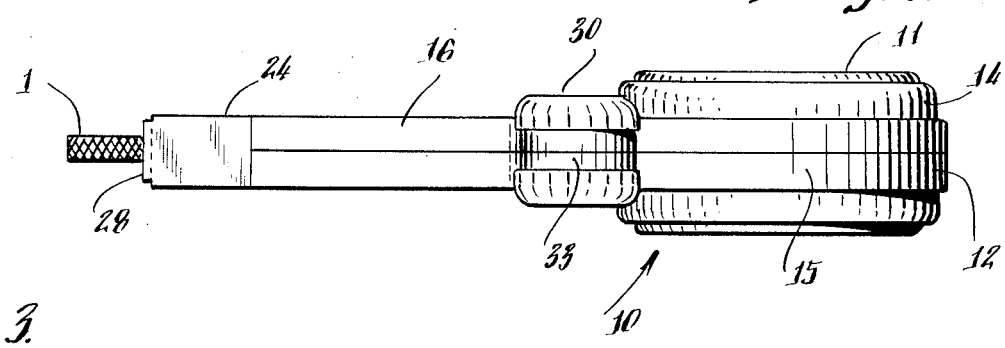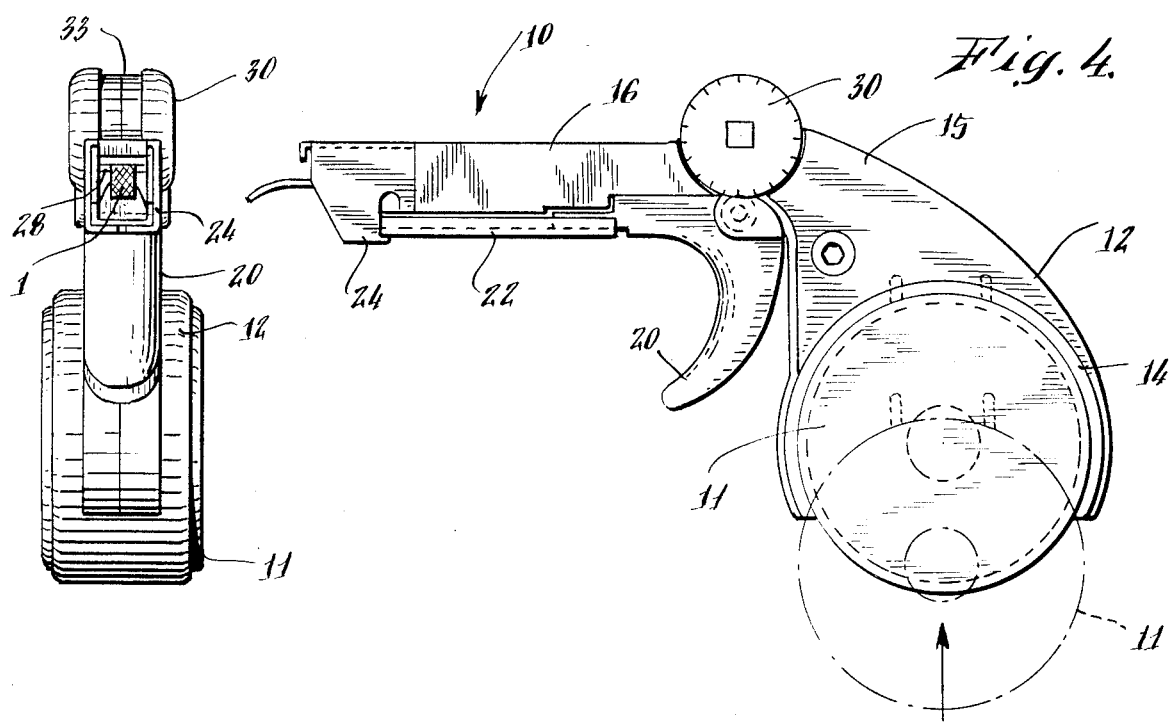

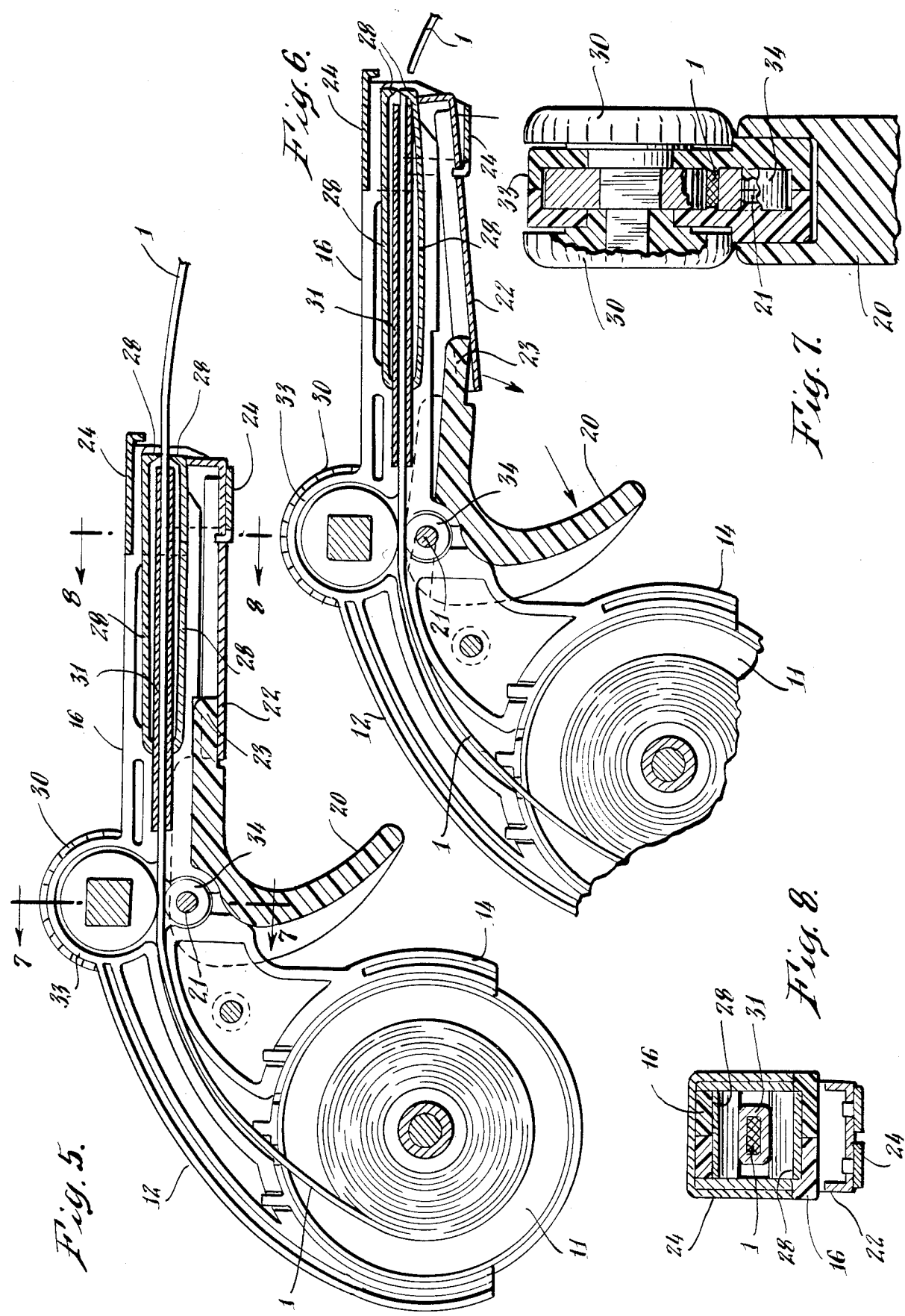

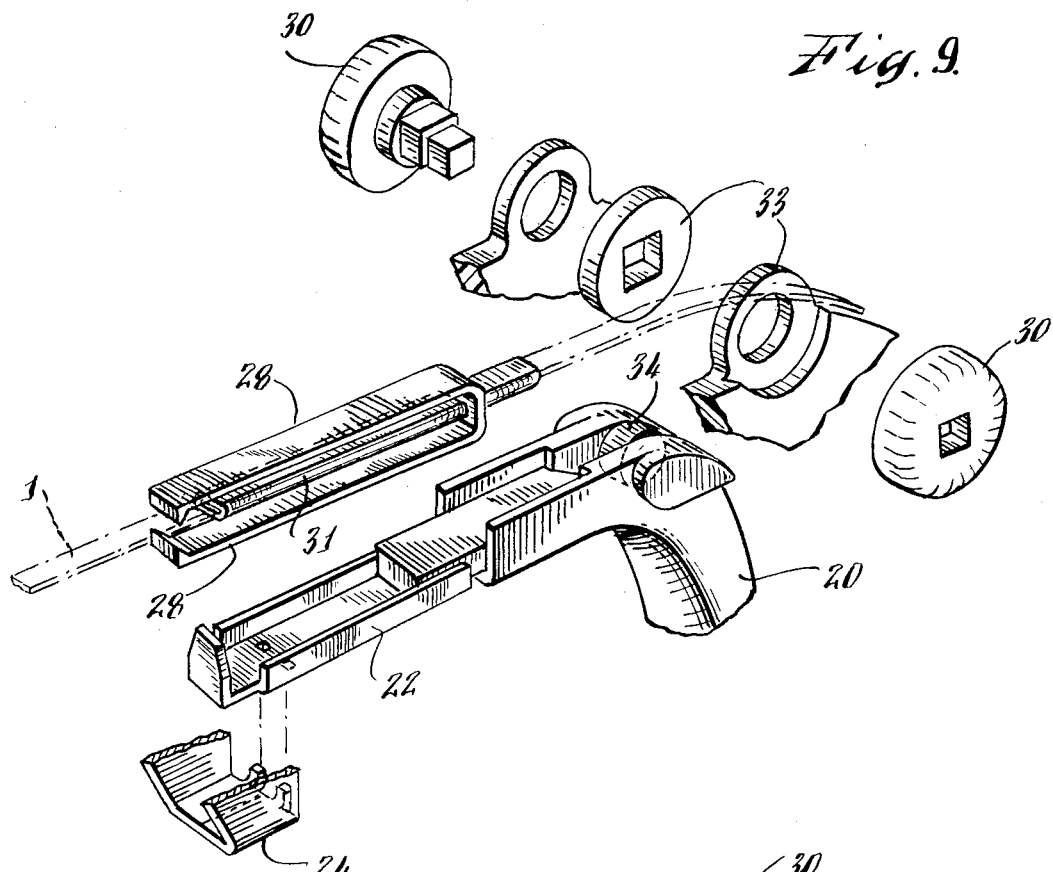
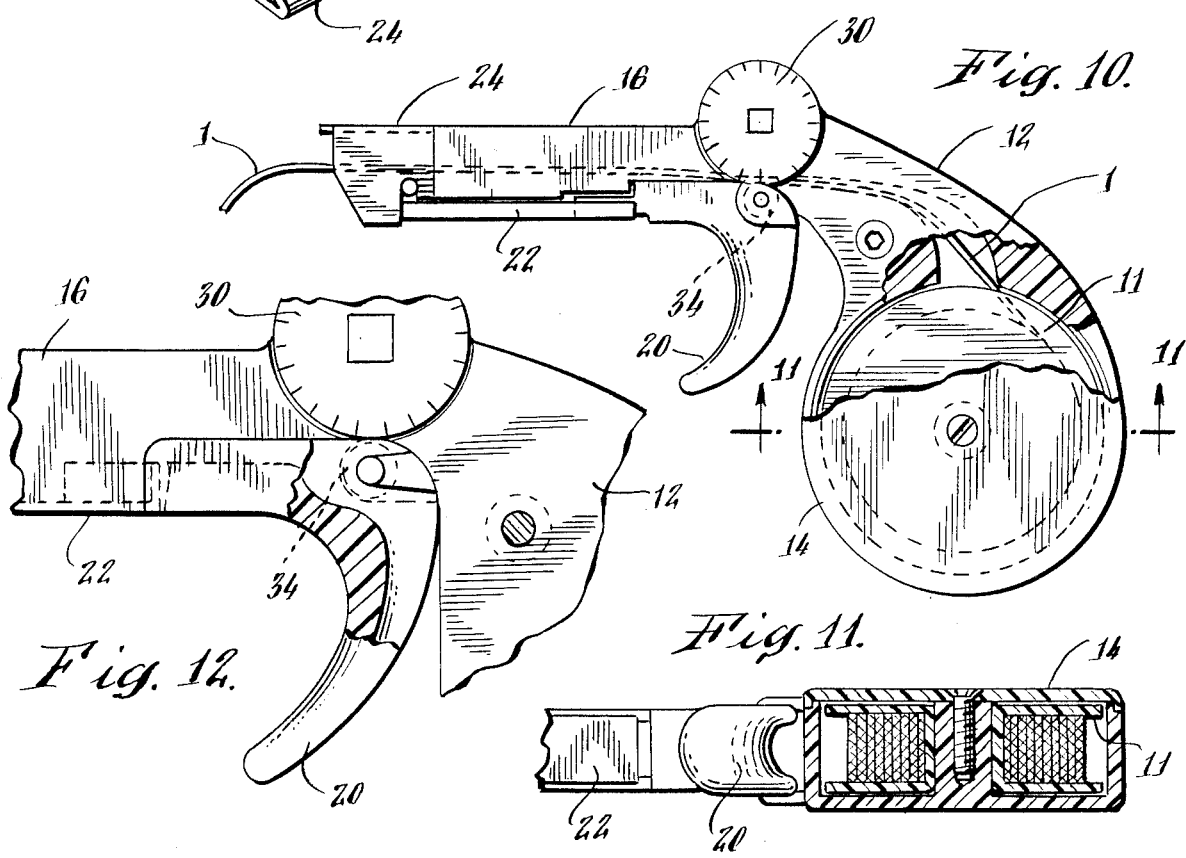

SOLDER REMOVAL DEVICES

BACKGROUND OF INVENTION

In the field of electronics manufacturing, it is known to use ribbons of fine, braided material, such as copper, which may be flux-coated, to capture and remove unwanted solder. For example, when circuit components, such as a transistor or a capacitor, fail or are no longer to be used as part of the circuitry, they may be removed by melting the solder that holds them in place. This may leave a quantity of solder that must be removed also if operations of the circuit are not to be compromised or impaired. Similarly, when such components are soldered to a printed circuit board, excess solder may accumulate in the region where the component lead is attached to the board surface. Similarly, bits of solder may have become deposited on the board surface as a result of spattering or dripping. Left unremoved, such unwanted solder can cause the circuit to malfunction or produce other undesirable results. The ribbon that is used for this purpose is sometimes referred to as "Desoldering Braid". In use, the ribbon is positioned atop or beside the solder that is to be removed. The solder and the ribbon are then heated until the solder is in a fluid state. At that point, the solder floods into the interstices of the braid where it is captured and held. The ribbon is removed from the site, the solder in the ribbon is permitted to harden, and the solder-laden part of the ribbon is cut off. In this connection, reference is made to U.S. Pat. Nos 3,267,191 (Hood, Jr.); 3,715,797 (Jackson et al); 3,726,464 (Howell et al); and 4,078,714, 4,164,606, and 4,323,631 (Spirig); and the references cited in each of the foregoing.

Various attempts have been made to package such ribbon material and to facilitate its use (e.g., see Howell et al U.S. Pat No. 3,726,464). However, such prior art attempts have draw backs and do not resolve long-standing needs as does the present invention. Included among them is a need for desoldering braid apparatus that can be used effectively while the other several hand-operations that usually attend the use of such materials are carried out (e.g., holding the braid strip; holding a soldering iron, torch, or other heat source; manipulating braid cutters; etc.) so as to make the use of such materials and apparatus easier and more efficient. Additionally, contamination of the braid from the operator's fingers if the operator has to hold the braid strip can result in poor solder joints. Further, there is the possibility of burning the fingers if they are held close to the heated areas. There is also the disadvantage of wasting braid because of lacking or inconsistent control of cutting techniques.

Accordingly, it is an object of this invention to provide apparatus for use in utilizing desoldering-braid material.

Another object is to provide such apparatus to facilitate the containing, positioning, dispensing, retrieving, and/or severing of desoldering braid material.

Still another object of this invention is to provide apparatus for utilizing desoldering braid with one hand so as to free the other hand to carry out collateral operations.

Yet another object of this invention is to provide such apparatus adapted to receive cassettes or other packages of desoldering braid.

STATEMENT OF INVENTION

Desired objectives may be achieved through the practice of this invention, embodiments of which include apparatus having a handle means, a receptacle for ribbon that is adapted to capture material in a fluid state, positioning means for locating the free end of such ribbon in desired locations, drive means for advancing ribbon from said receptacle to said positioning means and withdrawing it therefrom, and cutting means for severing off free-end portions of such ribbon.

DESCRIPTION OF DRAWINGS

This invention may be understood from the description which follows and from the accompanying drawings in which FIG. 1 is a perspective view of an embodiment of this invention, FIG. 2 is a top-view of the embodiment of this invention shown in FIG. 1, FIG. 3 is an end view of the embodiment of this invention shown in FIG. 1, FIG. 4 is side view of the embodiment of this invention shown in FIG. 1, FIG. 5 is a cross-sectional side view of the embodiment of this invention shown in FIG. 1 in use, with braid extended, FIG. 6 is another cross-sectional side view of the embodiment of this invention shown in FIG. 1 in use, with the braid being cut, FIG. 7 is a cross-sectional view through line 7—7 in FIG. 5, FIG. 8 is a cross-sectional view through line 8—8 in FIG. 5, FIG. 9 is an exploded view of a portion of the embodiment of this invention shown in FIG. 1, FIG. 10 is a side-view of another embodiment of this invention, FIG. 11 is a cross-sectional top view through line 11—11 in FIG. 10, and FIG. 12 is a cross-sectional side view of a portion of the apparatus shown in FIG. 1.

DESCRIPTION OF PREFERRED EMBODIMENTS

Reference is made first to FIG. 1, which depicts apparatus 10 embodying this invention. It includes a main body 15 having a handle 12 that is adapted and configured so that the apparatus may be hand-held with ease and effectiveness. The base of the handle 12 includes a receptacle 14 in which may be positioned a coil, reel, spool, or cassette of ribbon-like material, such as desoldering braid. If packaged in the form of a coil, reel or spool, the braid may be positioned within a covered housing portion of the handle 12 as shown in FIGS. 10 and 11. However, a preferred alternative is to package the braid in a cassette which may then merely be inserted as a unit as shown in FIG. 1. This option provides ease in handling and ensures that the braid will be less likely to become contaminated during insertion and while in storage. By these means, long lengths of ribbon may be accomodated, thus obviating the necessity for frequently replenishing or changing the ribbon supply.

Positioned in what is the thumb region of the operator's hand when the apparatus is as normally held, is a drivewheel 30 by means of which, through thumb-manipulation as hereinafter described, ribbon extending from a package or cassette 11 or other container positioned within the receptacle 14 may be caused to move forward or backward, to, through and out the end of the positioning means 16. As will be apparent from FIGS. 5, 6 and 9 in particular, the drivewheel 30 is moveably affixed to an inner wheel 33 which, when in operative position, bears against, or is in sufficiently close proximity to, an idler wheel 34, to form a nip through which ribbon 1 may be threaded and engaged for movement backward and forward as the drivewheel 30 is manipulated. Thus, when a length of desoldering braid is caused to extend from a package positioned within the handle, through the guide tube 31, and into the region of the outermost end of the positioning means, the positioning means 16 may be used to position a length of the ribbon 1 at a desired location by revolving the top of the drivewheel 30 backward toward the handle 12. Thus, one may apply heat to render unwanted solder into a fluid state using a soldering iron, torch, or other heat-source means in one hand and simultaneously, with the other hand, present a piece of braid to the heat-melted solder to remove it, for example, from the region of components on a printed circuit board. Following that, the ribbon may be withdrawn back into the positioning means by thumb-manipulation of the drive wheel 30 in the reverse direction; i.e., by moving the top of the wheel forward, in the direction away from the handle.

The apparatus 10 also includes a cutter mechanism which comprises a trigger 20 that is adapted and positioned for actuation by the index finger of the user. It also comprises an actuator bar 22, one end of which is moveably engaged by the trigger 20. As the front of the trigger deflects downward upon finger-actuation of the trigger 20, a front retainer 24 serves to retain the actuator bar 22 and to provide a fulcrum to produce upward deflection of the front end of the actuator bar 22, which then impinges upon and actuates the cutter 28, as shown in FIG. 6. The cutter advantageously is formed from a single piece if spring steel, so that it will have an inherent bias toward being in the open position. As will be apparent from the description which follows, that same inherent spring action, by virtue of the positioning of the various component parts in relation to the cutter, will also provide a return spring for the trigger and actuator bar, and will serve to retain the cutter in position within the tool because it is under compression and is thereby held captive behind the top front overhang of the positioning end of the tool. The retainer also serves as a removable seal for the outermost end of the apparatus, and facilitates assembly and dis-assembly of the various components to and from their normal operating positions. With respect to the latter, it will be seen particularly from FIGS. 5, 6 and 12, that the trigger 20 has small horizontal grooves located near the top of each of its sides into which normally fit correspondingly shaped and positioned bosses or pins that have been formed as part of the main body and extend inward into the slot in the front of the main body of the handle which accepts the trigger piece. As such, this structure is a preferred alternative to the retainer pin or screw 21 shown in FIGS. 4 and 10, as a pivot means for the trigger 20. Thus, with this preferred pivot means, it is possible to assemble and dis-assemble the trigger as well as the rest of the trigger-cutter mechanism, for example to replace worn or broken parts such as a dulled cutter, without having to remove or replace pins, screws or other retaining means such as the retaining pin 21. To assemble the apparatus, the cutter 28 is first positioned on the guide-tube 31 by inserting the guide-tube 31 through the hole in the back of the cutter 28, with the cutting surfaces of the cutter 28 facing toward the front of the apparatus. Then, depending upon whether the trigger pinion is formed by the preferred slot and boss structures shown in FIGS. 5, 6 and 12, or by any of the pinion structures such as that shown in FIGS. 4 and 10, the trigger 20 is located in its normal operating position. If pinioning of it is to be by utilization of the former structures, the trigger slots need only to be placed on the corresponding bosses or pins, since retention there of the trigger piece then will occur by the subsequent assembly of component parts as hereinafter described. On the other hand, if retention is to be by using a pin, screw or other pinion device as a trigger pivot means, that pinion will be inserted at this point in the assembly sequence. In either case, the retainer 24 is then positioned over the positioning end of the apparatus where it snap-locks into place by means of a tongue in the inner-most end of the retainer 24, all as shown particularly in FIG. 5. Finally the actuator bar 22 is slid into the opening in the front end of the retainer until the innermost end of the actuator bar engages the underside of the front end of the trigger. In practice, it may be found necessary to use a screwdriver or other small-bladed or pointed tool to deflect the cutters jaws together so as to provide clearance for the actuator bar 22 to be slipped over them and into its retainer position.

From the foregoing description, it will be clear that through use of apparatus according to this invention, it is possible to utilize desoldering braid and other materials in ribbon form more effectively for the purpose of removing unwanted materials that are in a fluid state. A spool, cassette, or other package of such material may be positioned within the receptacle of the apparatus, and a length of the ribbon fed into the nip formed by the idler wheel 34 and the outer surface of the inner-wheel 33 to which it is juxtaposed. Then, by manipulation of the drive wheel 30, the ribbon may be fed through the feeder-tube and out the end of the positioning means of the apparatus. Thereby, an exposed end-portion of the ribbon of desired length may be provided to soak up excess molten solder from a selected solder site. Thereafter, when the ribbon has been removed from the site and the solder entrapped in the ribbon has hardened, the ribbon may be withdrawn into the apparatus by further reverse manipulation of the drive-wheel to a desired extent such that the boundary between the unused ribbon and the solder-laden portion of the ribbon is just outside the curring line of the cutter blades. The trigger may then be pulled, causing the cutters to sever off the solder-laden portion of the ribbon for disposal. Therafter, a new length of ribbon may be extended out from the apparatus for further use by repeating the foregoing sequence of operations. It should be noted in particular that all of these operations may be carried out by this means using only one hand, thus freeing the other hand of the operator to perform the various other operations that normally attend such activities, such as holding a torch, iron, or other heat source, using tweezers to hold components, removing debris, etc.

It is to be understood that the embodiments shown, described and depicted herein are by way of illustration and not of limitation, and that other embodiments may be made without departing from the spirit or scope of this invention.

I claim:

1. Apparatus for manipulating a ribbon-like continuum of material adapted to receive and retain liquid comprising, handle means for hand-holding said apparatus, receptacle means for holding a continuum of said material, positioning means including a tubular channel for selectively locating the outermost end portion of said continuum at a desired location, path means for guiding said continuum from said recepatacle means to said positioning means, rotary drive means for causing said continuum to move selectively to and fro between said receptacle means and said positioning means, and trigger actuated cutting means adapted for cutting off the outermost portion of said continuum after it has become liquid-laden.

2. The apparatus described in claim 1 wherein said receptacle means is adapted to receive and retain a cassette containing a continuum of said material.

3. The apparatus described in claim 1 wherein said cutting means includes a cutter, a trigger, a retainer, and an actuator bar by means of which actuation of said trigger will cause actuation of said cutter, wherein said actuator and said trigger are moveably retained in operating position by means of said retainer.

4. The apparatus described in claim 1 wherein said drive means comprises at least one element that is adapted for finger contact to effect movement of said drive means and is separate from but moves concurrently with an associated element adapted to contact said continuum to move it to and fro.

5. A hand tool for manipulating desoldering ribbon comprising a handle, a desoldering ribbon receptacle located within said handle that is adapted to receive and retain a cassette containing a continuum of desoldering ribbon, a desoldering ribbon positioner integral with said handle, a thumb-actuated drivewheel mechanism positioned between said receptacle and said positioner which forms a nip through which desoldering ribbon may be passed and by which such desoldering ribbon passing through said nip may be caused selectively to move away from and toward said receptacle, a guide tube positioned between said drivewheel mechanism and said positioner for guiding desoldering ribbon to the positioner as it is moved away from said receptacle by actuation of said drivewheel mechanism, a cutter positioned within said positioner for severing off portions of said desoldering ribbon extending past said positioner, a trigger that is moveably affixed to asid handle and is adapted to actuate said cutter, and an actuator bar that extends between said trigger and said cutter to cause acutation of said cutter by movement of said trigger, wherein said trigger is moveably affixed to said handle by means of side grooves which slip fit over corresponding bosses that are integral with said trigger and said handle, and wherein said trigger and said actuator bar are moveably retained in operative position by means of slip fit interconnection between one end of said actuator bar and said trigger and by means of a retainer positioned about said positioner and said actuator bar in the region opposite that end of the actuator bar at which said trigger is located.

6. A hand tool for manipulating desolering ribbon comprising a handle, a desoldering ribbon receptacle located within said handle, a desoldering ribbon positioner integral with said handle, a thumb-actuated drivewheel mechanism positioned between said receptacle and said positioner which forms a nip through which desoldering ribbon may be passed and by which such desoldering ribbon passing through said nip may be caused selectively to move away from and toward said receptacle, a guide tube positioned between said drivewheel mechanism and said positioner for guiding desolering ribbon to the positioner as it is moved away from said receptacle by actuation of said drivewheel mechanism, a cutter positioned within said positioner for severing off portions of said desoldering ribbon extending past said positioner, and a trigger that is moveably affixed to said handle and is adapted to actuate said cutter.

7. The hand tool described in claim 1 wherein said receptacle is adapted to receive and retain a cassette containing a continuum of desoldering ribbon.

8. The hand tool described in claim 1 wherein said receptacle is a closed compartment having a removeable cover, wherein coils and spools of desoldering ribbon may be positioned.

9. The hand tool described in claim 1 including an actuator bar that extends between said trigger and said cutter to cause actuation of said cutter by movement of said trigger, wherein said trigger is moveably affixed to said handle by means of side grooves which slip-fit over corresponding bosses that are integral with said trigger and said handle, and wherein said trigger and said actuator bar are moveably retained in operative position by means of a slip fit interconnection between one end of said actuator bar and said trigger and by means of a retainer positioned about said positioner and said actuator bar in the region opposite that end of the actuator to that at which said trigger is located.

10. The hand tool described in claim 1 in combination with a cassette containing a continuum of desoldering ribbon.

* * * * *